(12) United States Patent
Uziel et al.

(10) Patent No.: US 7,870,523 B1
(45) Date of Patent: Jan. 11, 2011

(54) SYSTEM AND METHOD FOR TEST GENERATION WITH DYNAMIC CONSTRAINTS USING STATIC ANALYSIS AND MULTIDOMAIN CONSTRAINT REDUCTION

(75) Inventors: Shlomi Uziel, Jerusalem (IL); Amos Noy, Jerusalem (IL); Vitaly Lagoon, Caulfield South (AU); Yael Kinderman, Tel Aviv (IL); Amit Gal, Jerusalem (IL)

(73) Assignee: Cadence Design Systems, Inc., San Jose, CA (US)

( * ) Notice: Subject to any disclaimer, the term of this patent is extended or adjusted under 35 U.S.C. 154(b) by 873 days.

(21) Appl. No.: 11/453,094

(22) Filed: Jun. 15, 2006

(51) Int. Cl.
*G06F 9/45* (2006.01)
*G06F 17/00* (2006.01)
*G06E 1/04* (2006.01)

(52) U.S. Cl. .................. 716/5; 706/19; 703/2
(58) Field of Classification Search .............. 716/5; 706/19; 703/2
See application file for complete search history.

(56) References Cited

U.S. PATENT DOCUMENTS

| 6,182,258 | B1* | 1/2001 | Hollander | 714/739 |
|---|---|---|---|---|
| 6,684,359 | B2 | 1/2004 | Noy | |
| 6,698,003 | B2 | 2/2004 | Baumgartner et al. | |
| 7,260,562 | B2* | 8/2007 | Czajkowski et al. | 706/46 |
| 7,409,377 | B2* | 8/2008 | Emek et al. | 706/46 |
| 2002/0169587 | A1* | 11/2002 | Emek et al. | 703/2 |
| 2005/0222827 | A1* | 10/2005 | Emek et al. | 703/2 |
| 2007/0100781 | A1* | 5/2007 | Geller et al. | 706/46 |
| 2007/0266359 | A1* | 11/2007 | Esbensen et al. | 716/10 |

OTHER PUBLICATIONS

Kuehlmann, A., et al., "Robust Boolean Reasoning for Equivalence Checking and Functional Property Verification", IEEE Transactions On Computer-Aided Design Of Integrated Circuits and Systems, vol. 21, No. 12, Dec. 2002.

* cited by examiner

*Primary Examiner*—Jack Chiang
*Assistant Examiner*—Patrick Sandoval
(74) *Attorney, Agent, or Firm*—Rosenberg, Klein & Lee

(57) ABSTRACT

The present invention provides a system and method for resolving a test generation problem involving constraint resolution problems where a verification environment includes constraints that are suitable for resolution using one type of solver for a first domain and other constraints that are suitable for resolution using a different solver in a second domain. The invention further comprises variables and, in instances where at least one variable is in each of the first and second domains, using these solvers to restrict the set of permissible values of variables to be consistent in multiple domains, preferably in all relevant domains.

A constraint resolution problem is divided into clusters of constraints connected within a domain, and connected clusters of clusters that are connected through shared variables that are subject to constraints in more than one cluster.

A preferred solver is applied to constraints in each of various domains such that constraints in multiple clusters and domains in a connected cluster are consistent for connected constraints in a domain, and preferably all constraints in all clusters in all domains within the connected cluster are consistent.

28 Claims, 3 Drawing Sheets

SYSTEM AND METHOD FOR TEST GENERATION WITH DYNAMIC CONSTRAINTS USING STATIC ANALYSIS AND MULTIDOMAIN CONSTRAINT REDUCTION

FIELD AND BACKGROUND OF THE INVENTION

The present invention relates to a system and method for test generation with dynamic constraints, and in particular, to a system and method for resolving constraints in multiple domains by creating a set of instructions which provide one or more specific, random solutions when executed.

Design verification is the process of determining whether an integrated circuit, board, or system-level architecture, exactly implements the requirements defined by the specification of the architecture for that device. Design verification for a device under test (DUT) may be performed on the actual device, or on a simulation model of the device. For the purposes of explanation only and without intending to be limiting in any way, the following discussion centers upon testing that is performed on simulation models of the device.

As designs for different types of devices and device architectures become more complex, the likelihood of design errors increases. However, design verification also becomes more difficult and time consuming as the simulation models of the design of the device also become more complex to prepare and to test.

The process of verifying a design through a simulation model of the device is aided by the availability of hardware description languages such as Verilog and VHDL. These languages are designed to describe hardware at higher levels of abstraction than gates or transistors. The resultant simulated model of the device can receive input stimuli in the form of test vectors, which are a string of binary values applied to the input of a circuit. The simulated model then produces results, which are checked against the expected results for the particular design of the device. However, these languages are typically not designed for actual verification. Therefore, the verification engineer must write additional programming code in order to interface with the models described by these hardware description languages in order to perform design verification of the device.

Within the area of testing and verification environments, both static and dynamic testing and verification environments traditionally have been implemented with fixed-vector or pre-generation input. More recently, a more powerful and more sophisticated implementation uses test generation to produce the DUT input in concurrence with the simulation of the model of the DUT.

A useful and efficient type of testing is a dynamic testing environment. For this type of environment, a set of programming instructions is written to generate the test vectors in concurrence with the simulation of the model of the DUT with potential inputs from feedback from the simulated device. This procedure enables directed random generation to be performed and to be sensitive to effects uncovered during the test itself on the state of the simulation model of the device. Thus dynamic test generation clearly has many advantages for design verification.

One example of such a test generator is disclosed in U.S. Pat. No. 6,182,258, issued Jan. 30, 2001 (application Ser. No. 09/020,792, filed on Feb. 6, 1998) and U.S. Pat. No. 6,684,359, issued Jan. 27, 2004, each incorporated by reference as if fully set forth herein. This test generation procedure interacts with, and sits as a higher level over, such hardware description languages as Verilog and VHDL. The test generation procedure is written in a hardware-oriented verification specific object-oriented programming language. This language is used to write various verification environments, which then can be used to automatically create a device verification test managed by a test generator module. A wide variety of design environments can be tested and verified with this language. Thus, the procedure is generalizable, yet is also simple to program and to debug by the engineer. The language features a number of elements such as "structs" for more richly and efficiently describing the design of the device to be simulated by the model.

Currently available commercial systems, such as Specman Elite software available from Cadence Design Systems, support resolving dynamic constraints through a specific, correct solution, the specific solution random within but compliant with the constraints. The solution is created by executing a specific set of instructions. In the course of testing a simulation, large numbers of such solutions can be generated and tested in the test environment. A typical test may utilize many thousands of specific sets of values. This tool provides a good, random solution for dynamic constraints in a reasonable processing time, and can react dynamically on the same time scale as the time period that is actually required for simulation.

A problem with existing solutions is that certain constraints are best resolved (or solved) using one type of a solver, while other constraints are best resolved with a different solver that is itself not very efficient for resolving the first type of constraints. For example, constraints that are primarily arithmetic are well matched to an arithmetic solver using, for example, range lists, such as those described in U.S. Pat. No. 6,182,258. Arithmetic constraints include linear programming or differential equations, or even simple relationships like greater than, less than, equal to, sum or difference of multiple values (variable or constant), and so on. In similar manner, constraints that are primarily binary are well matched to a binary solver using, for example binary decision diagrams (BDD). Unfortunately, binary solvers are generally not very useful for resolving arithmetic constraints, and arithmetic solvers are not well suited to resolving binary constraints. This means that the solver may (but may not) be able to present a useable solution, and in any event the process of resolving non-compatible constraints is at best slow and/or inefficient. Another useful solver known in the art is a SAT (satisfiability) engine. This solver is well adapted to constraints that have certain mixes of binary and arithmetic properties, but even here the solver is not optimized for binary or arithmetic constraints by themselves, and thus is itself not as efficient as a binary solver for primarily binary constraints, or as efficient as an arithmetic solver for primarily arithmetic constraints.

A major problem with any one of these solvers is that the constraints in a given design often contain a mix of constraints that are not entirely well suited for resolution with any one solver. It would be helpful to match certain types of constraints with an appropriate solver, and to match other constraints in the same design with a different appropriate solver, thus providing to each of the constraints at hand a solver well adapted to that constraint. Combining two or more solvers in a modular fashion for the purpose of test generation is neither straightforward nor simple, and has not been done before. For example, coordination of solver to constraint and a variety of run-time issues need to be addressed.

Multiple solvers have been used in model checking, however this is a very different application with different requirements and results. In U.S. Pat. No. 6,698,003, an IBM patent, Baumgartner et al discuss multi-engine model checking for verification. The "verification problem" mentioned in the patent is a model checking problem namely, "Does a property hold over a design?" It is not about constraint resolution. See also Robust Boolean Reasoning for Equivalence Checking and Functional Property Verification IEEE TRANSACTIONS ON COMPUTER-AIDED DESIGN OF INTEGRATED CIRCUITS AND SYSTEMS, VOL. 21, NO. 12, DECEMBER 2002. This is an overview paper describing the usefulness of a multi-engine approach across CAD applications. This also does not disclose constraint resolution according to the present invention.

Therefore there is an unmet need for, and it would be highly useful to have, a system and method for resolving constraints in multiple domains to make available one or preferably more than one random but correct, specific solutions that can be utilized in a test environment.

SUMMARY OF THE INVENTION

The present invention provides a system and method for resolving a test generation problem involving constraint resolution problems where a verification environment includes constraints that are suitable for resolution using one type of solver for a first domain and other constraints that are suitable for resolution using a different solver in a second domain. The invention further comprises variables and, in instances where at least one variable is in each of the first and second domains, using these solvers to restrict the set of permissible values of variables to be consistent in multiple domains, preferably in all relevant domains.

A constraint resolution problem is divided into clusters of constraints connected within a domain, and connected clusters that are clusters connected through shared variables, each variable subject to constraints in more than one cluster. A preferred solver is applied to constraints in each of various domains such that constraints in multiple clusters and domains in a connected cluster are consistent for connected constraints in a domain, and preferably all constraints in all clusters in all domains within the connected cluster are consistent.

The present invention tests the functional correctness of a simulation model for the DUT using constraints and constraint resolving as a precursor to test generation for the testing and verification process. The constraint resolving is managed in two or more domains. The present invention provides such constraint resolving through identification of constraints as being suitable for resolving by various solvers, each solver having a "domain" for the constraints that are to be resolved using that solver. The invention further provides assigning each constraint to a suitable solver (and thus to a corresponding domain for that solver), then resolving constraints within each domain while providing a test solution comprising restricting the set of permissible values for each desired variable that satisfies constraints in all selected domains.

Constraints are identified and grouped in sets of various hierarchies. A set of constraints that are connected through variables and/or constants but are within a single domain is called a "cluster." In many instances, a cluster in one domain and a cluster in a second domain share a variable, which is to say that a shared variable is subject to constraints in the first domain and different constraints in a second domain. There may be more than one variable shared between two specific clusters.

A collection of clusters connected to each other is, for purposes of this invention, considered a connected cluster. There may be many clusters in a single connected cluster, all connected, one to another, in various topologies. Each pair of clusters is linked by one or more shared variables, and the next pair, if present, is linked by one or more different shared variables. Each pair of clusters has one cluster in one domain and a second cluster in a second domain. There may be more than two domains (and corresponding solvers). Each set of clusters is linked by at least one shared variable, shared by clusters in at least two and up to as many as all available domains.

The system can dynamically resolve constraints for test generation for a DUT (device under test), using: (a) a data model for the DUT input including a set of variables, with constraints over these variables in each of two or more domains; and (b) a test generator comprising an executive and a plurality of domain specific constraint resolution engines, such that the test generator generates tests according to the data model.

The association of a cluster and a constraint resolution engine is called here a propagator. The propagators are scheduled by an executive layer that employs heuristics to determine the order of calls to solvers, in order to minimize the amount of computation.

Some variables are shared between more than one domain, and when one propagator changes the computed set for such a variable, the propagator for the other domain this variable belongs to can be invoked to maintain consistency in the other domain. For example, resolving a cluster in a first domain may reduce the permissible set of values for a shared variable. That permissible set of values should be resolved in any other domain shared by that variable. So changing the permissible set of values for a shared variable in a first domain requires that the permissible set of values be tested in a second domain shared by that variable, such as by initiating a propagator for the resolution of the cluster containing that shared variable in a second domain.

If the permissible set of corresponding values for the shared variable is not permitted under the constraints of the second domain, then the set of values of variables in the first domain should be resolved again until a set of permissible values for the shared variable in all affected domains is identified. There may be any number of domains including the shared variable. There may be any number of shared variables, in any number of domains. In a preferred implementation, propagators are launched as needed until all domains are consistent for all shared variables.

Hereinafter, the term "computing platform" refers to a particular computer hardware system or to a particular software operating system. Examples of such hardware systems include, but are not limited to, personal computers (PC), Macintosh computers, mainframes, minicomputers and workstations. Examples of such software operating systems include, but are not limited to, UNIX, VMS, Linux, Solaris, MacOS, DOS, FreeBSD, one of the Windows operating systems by Microsoft, Inc. (USA), including Windows NT, Windows95, Windows98, Windows 2000 and Windows XP.

Hereinafter, the term "non-random" refers to a process, or an entity selected by the process, which is not random but which is not necessarily deterministic.

The method of the present invention could also be described as a plurality of instructions being performed by a virtual or actual data processor, such that the method of the present invention could be implemented as hardware, software, firmware or a combination thereof. For the present invention, a software application could be written in substantially any suitable programming language, which could easily be selected by one of ordinary skill in the art. The programming language chosen should be compatible with the computing platform according to which the software application is executed. Examples of suitable programming languages include, but are not limited to, C, C++, e, and Java.

According to the present invention, there is provided a method for resolving a plurality of constraints over a plurality of domains for test generation for a DUT (device under test), each constraint featuring at least one variable, the method being performed by a data processor, the method comprising: (a) creating at least one dynamic graph for describing the plurality of dynamic constraints, each node of the at least one dynamic graph representing a variable, and each edge representing a constraint in a specific domain; (b) assigning portions of the graph to propagators according to the determined domains (said propagators associated with specific constraint resolution engines) and (c) resolving the constraint system by scheduling the propagators to compute a set of possible values for each variable, maintaining consistency across the domains.

A further method of the invention comprises partitioning the graph into sub-graphs of connected constraints, and further partitioning these constraints into sets of constraints relating to specific domains. A cluster of connected constraints within a single domain is associated with a specific constraint resolution engine. There may be many clusters in that domain, and there may be many clusters in another domain, associated with a different, specific constraint resolution engine. However, while some clusters may be connected to another cluster, there may be many, many clusters that are not connected, directly or indirectly, to a selected cluster. While a sub-graph may refer to any subset of a graph, for purposes of this invention disclosure, a cluster is a specific type of sub-graph, specifically a cluster is a set of connected constraints within a single domain. A set of clusters that are connected to each other through some one or more shared variables is a connected cluster. There may be many connected clusters in verification environment, each consisting of two or more clusters, but not connected to other connected clusters.

A method of this invention selects two solvers, each reasonably well suited to resolving a class of constraints in a corresponding domain but not so well suited for solving constraints not in the corresponding domain. In a verification environment, constraints are identified as corresponding to each of the available solvers, and one or more sets of connected constraints within a single domain are identified, each set as a cluster. A cluster may include a variable that is subject to one or more constraints in a different domain and thus in a different cluster. Two or more clusters may be connected, each through at least one shared variable, and each collection of clusters is called a connected cluster. The invention further uses the first solver to solve constraints in the corresponding first domain, and uses the second solver to solve constraints in the corresponding second domain. The invention may further use additional solvers, with additional corresponding domains. The invention manages propagators, one for each cluster, as a connection to the solvers for each cluster, and launching a propagator has the corresponding solver resolve constraints in the corresponding cluster.

Further, the invention includes a system with two solvers, an executive linking and capable of initiating the solvers, with the executive connected to information about clusters in the verification environment. The solvers can be chosen to have capabilities well suited to resolving one class of constraints and less well suited to resolving a second class of constraints, for which second class the second solver is well suited. The invention comprehends additional solvers, all connected to the executive. A further system of the invention provides means to communicate information about propagators to the executive, and to communicate changes in the set of values of shared variables that can be used by the executive to schedule solvers to resolve clusters containing the identified propagators.

Further the invention includes means for selecting solvers suitable for classes of constraints, and using the set of values from a shared variable to generate test generation instructions for a verification environment. This invention is enhanced by providing additional solvers, identifying clusters, identifying connected clusters, and propagators. The invention further provides for managing an executive using propagators to schedule solvers to resolve constraints in corresponding clusters.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
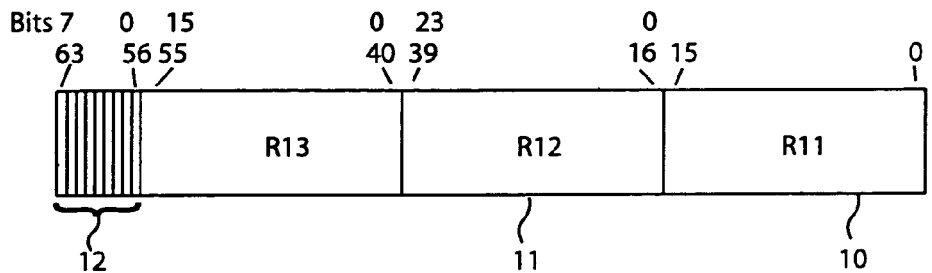
FIG. 1 depicts a representative portion of a DUT design; here a 64-bit register including 16 bit R11, 24-bit R12, 16-bit R13 and 8 one bit flags.

The present invention provides a system and method for resolving a test generation problem involving constraint resolution problems where a verification environment includes constraints that are suitable for resolution using one type of solver for a first domain and other constraints that are suitable for resolution using a different solver in a second domain. The invention further comprises variables and, in instances where at least one variable is in each of the first and second domains, using these solvers to restrict the set of permissible values of variables to be consistent in multiple domains, preferably in all relevant domains.

A constraint resolution problem is divided into clusters of constraints connected within a domain, and connected clusters of clusters that are connected through shared variables that are subject to constraints in more than one cluster. A preferred solver is applied to constraints in each of various domains such that constraints in multiple clusters and domains in a connected cluster are consistent for connected constraints in a domain, and preferably all constraints in all clusters in all domains within the connected cluster are consistent.

Variables, also referred to as parameters or fields, are represented sometimes as nodes.

Resolving constraints at least partially in the static analysis stage, before run-time, makes the run-time process of constraint resolution both more effective and more efficient. One useful constraint resolution engine is disclosed in U.S. Pat. No. 6,684,359.

Certain constraints are amenable to effective resolution using a certain solver, but other constraints may be resolved only inefficiently using that same solver. For example, a solver that is well suited to managing bit constraints such as maintaining Boolean relations between binary variables may be well suited to resolving various Boolean constraints, but poorly suited to resolving arithmetic constraints. In like manner, a solver which is well suited to resolving various arithmetic constraints such as "greater than constant X," "R2+5," or "a member of the list of integer values 1, 2, 3, 5, 7" may be less well suited for resolving binary constraints.

By providing multiple solvers and identifying constraints suitable for testing, characterization and resolution in a first domain consistent with a first preferred solver, and other constraints suitable for testing, characterization and resolution in a second domain with a second preferred solver, a test environment can be constructed more efficiently than for prior art methods using only a single solver. In the event that a variable is subject to constraints in more than one domain, each domain needs to be resolved, and for a set of permissible values of the variable in one domain that is inconsistent with the constraints in any other domain for that variable, the connected constraints can be resolved in the other domain as well until a solution is found that satisfies constraints connected to that variable in at least two and preferably all relevant domains.

An advantage of the present invention is that the static analysis of the constraints, and consequent production of a corresponding domain-specific propagator, enables many complex operations to be performed during the stage of static analysis. In a preferred embodiment, the set of permissible values of variables can be limited consistent with constraints in more than one domain so that permissible values can be readily identified at verification run time.

Further advantages of the present invention include the utilization of multiple solver engines, where each solver is provided the sub-problem it can solve most efficiently, yielding an overall efficient resolution mechanism. The principles and operation of the system and method according to the present invention may be better understood with reference to the drawings and the accompanying description.

According to a preferred embodiment of the present invention, constraints and I/O data models are preferably constructed in e code, which is the code language provided by the Specman Elite functional programming environment (Cadence Design Systems, Inc., San Jose, Calif., USA) and disclosed in part in U.S. Pat. No. 6,182,258. Such an embodiment is preferred because of the ease and flexibility of programming in e code.

The e code language is a hardware-oriented verification specific object-oriented programming language. Objects in this language are instances of "structs", which contain a field, and one or more functions, or methods, which operate on data stored within the field and which interact with other objects. Optionally, a constraint can operate on the field, thereby altering the data stored in the field, for example by restricting the set of possible values for the data. The field can also be used to store more complex structures, including other structs and lists of scalars or structs.

The process of test generation fills data elements, including structs and fields, with values or sets of permissible values. These values or sets of values may be assigned at random, although full random testing is both time consuming and not necessarily optimal for testing a DUT. The possible data values for each element can optionally be limited by constraints, which provide the direction for the directed test generation. For dynamic constraints a selected, specific solution is provided for each instance of test generation. This solution is then used to provide limitations on the generated data values.

An exemplary test environment is shown in U.S. Pat. No. 6,684,359 (issued Jan. 27, 2004), including an AGM (abstract generation machine) module with a constraint resolution engine, in addition to static analysis module and run-time interpreter. The constraint resolution engine enables the process of resolving constraints to be at least partially performed before run-time, in the static analysis stage, thereby making the process of constraint resolution both more effective and more efficient.

In the process of specifying, designing, testing, and building an electronic system, a specification for the system is modeled using a hardware description language (HDL) such as Verilog. Suitable aspects of the model can be described in other languages such as the e language. Referring to FIG. 1, an illustrative component of a system is a register, shown as a 64 bit register, composed in turn of 16 bit register 1 (R11) 10, 24 bit register 2 (R12) 11, 16 bit register 3 (R13), and 8 flag bits 12. The bit positions of the overall register as well as the component registers and flags are noted in the drawing. In the operation of the electronic system, various inputs will lead to these registers and flags holding certain data from time to time. It is helpful to test the system by setting these registers to have various values, the contents of which need to conform to various rules that govern the operation of the system, according to the specification, and as well according to what other components of the system can affect the contents of these registers and flags.

Figure 2:
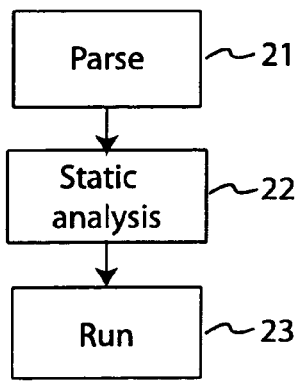
FIG. 2 illustrates an overall process of parsing the DUT model, performing static analysis, and generating tests.
Figure 3:
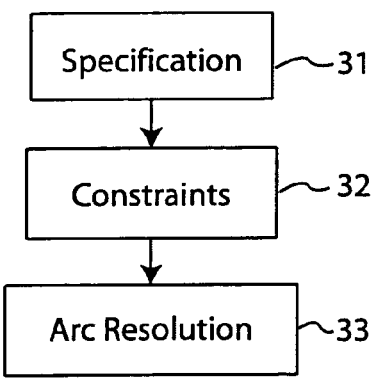
FIG. 3 illustrates how a product specification can be characterized or represented by one or more constraints, which in turn can be represented by arcs, which are resolved in a graph process.

In modeling the system, a description of the system is parsed in a manner suitable for the tool or tools to be used to model, simulate or otherwise work with the description. In using a test or verification environment, according to a preferred embodiment of the invention, the model is submitted to static analysis, generating some instructions for use during run-time simulation of the system. This general process is illustrated in FIG. 2. Looking more closely at the process, FIG. 3 illustrates that the specification 31 is described in part as one or more constraints 32 that describe, for example, the relationship between a variable and one or more other variables or constants. Where more than one constraint impacts the set of permissible values of a variable or group of variables, it is helpful to provide a solution, which may be a partial solution, to limit the set of values of variables to desired values, particularly to values that satisfy any relevant constraints, in other words, "legal" or permissible values. There are times when testing improper or dis-allowed values is of interest, and it is helpful to be able to select such values and present them to the test environment.

The present invention tests the functional correctness of a simulation model for the DUT using constraints and constraint resolving as a precursor to test generation for the testing and verification process. The constraint resolving is managed in two or more domains. The present invention provides such constraint resolving through identification of constraints as being suitable for resolving by various solvers, each solver having a "domain" for the constraints that are to be resolved using that solver. The invention further provides assigning each constraint to a suitable solver (and thus to a corresponding domain for that solver), then resolving constraints within each domain while providing a test solution comprising restricting the set of permissible values for each desired variable that satisfies constraints in all selected domains.

More specifically, the present invention provides such constraint resolving through identification of a selected constraint as being suitable for resolving by a selected one of more than one available solvers, assigning the constraint to a selected solver, then resolving the constraint within the domain for that solver. The selected solver may or may not be "ideal" or "best" for resolving the constraint, although in a typical implementation the solver is chosen to provide a useful solution of the constraint. In a preferred embodiment, each constraint is matched to a preferred solver. This is performed for any number of constraints and domains, preferably fully resolved for all constraints and all domains, but it is possible to perform this for less than all constraints, less than all the domains, and with less than complete resolving.

A given constraint may be "connected" to other constraints, that is, all constraints acting on one or more variables or limited by constants which variables or constants may be in turn linked to or by other constraints such that a constant or the set of permissible values of a variable may affect the set of permissible values of another variable. It is helpful to identify a complete set of constraints that are connected, and not including constraints that are not connected. The connected constraints may be quite simple, such as the instance where the only constraint links a single variable to a single constant. There may be one or more constants, or no constants at all. There may be many variables, or only one.

A constraint resolution engine in each domain may optionally be viewed as a type of state machine, in which individual states of the state machine are more preferably represented by one or more dynamic graphs.

Figure 5:
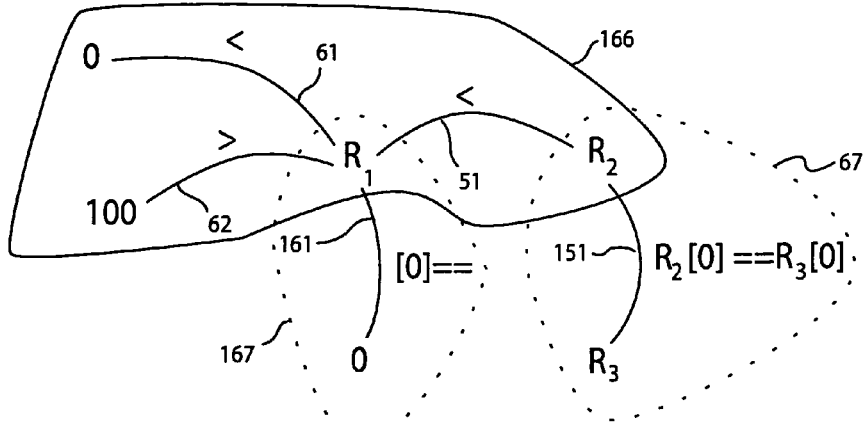
FIG. 5 illustrates a more complex graph illustrating multiple constraints in a first domain, and multiple shared variables.

A number of such connected constraints are illustrated herein, for example in FIG. 5 where constraints 51, 61 and 62 connect two constants and nodes (which represent variables) R1 and R2 such that the values of the variables are subject to the constraints but still may contain a set of permissible values. Changing one of the variables may require analysis of the entire collection of connected constraints so that a set of permissible values for any involved variables may be selected.

It is helpful to identify a complete set of connected constraints within a single domain as a "cluster." Some of these clusters may be, for example, quite simple (the variable is constrained to be a constant or have some other fixed value in the selected domain) or quite complex (for example, subject to a large number of connected constraints that connect a large number of variables and/or constants). Additional clusters can represent additional sets of connected constraints, each set in a given domain. A group of clusters that are linked through shared variables can be considered a "connected cluster." Each domain may include one or more clusters within that domain, and the clusters may be connected to zero or more other clusters to form one or more connected clusters within the total verification environment.

Where a variable is shared in more than one domain, that variable may be subject to constraints in each such domain, and represented as part of a cluster in each such domain for constraints in each such domain that are connected to the variable. Variables that have constraints in more than one domain (shared between the domains) preferably are consistent with constraints in each domain. In some constraint resolution problems, reaching consistency may involve iteration of solutions within a domain as well as between domains. While the system and method is useful in two domains, it is further useful in two or more domains when applicable to the testing and possible environments at hand.

Each cluster can be represented by a propagator. The propagator can be invoked whenever a value or set of permissible values for a variable within the propagator is changed, or such a change is requested or is to be tested. For purposes of this invention, a propagator preferably covers each set of connected constraints in a given domain. In a preferred embodiment a single propagator is matched with each cluster, regardless of whether the cluster has one or more variables, and one or more shared variables. In one preferred embodiment, a cluster has a single propagator even when more than one shared variables are shared with more than one other clusters. A shared variable will in general be represented by a propagator in each domain in which the variable is shared.

One well known method of modeling a system of variables and constraints is to graph the variables (or constants) as nodes in a graph, with each node connected by edges in the graph that represent constraints between variables corresponding to the nodes. By way of illustration and referring to FIG. 4, nodes (variables) R1, R2, and R3 are connected to each other by constraints 51 and 151 as shown. To develop a set of values of the nodes that satisfy the constraints in cluster 66 (in the arithmetic domain), one preferred method is to assign a permissible set of values to a first variable, such as R1, then reduce the permissible set of values of connected variable R2 in a manner consistent with constraint 51. If the resolved constraint 51 permits the original set of values of variable R1 then a satisfactory set of permissible values has been identified. Various ways of traversing the graph are known in the art. One general solution is to start with a list or description of the entire set of values permitted for variable R1, then to identify all corresponding permitted values of variable R2 so that a list or description of all or at least some selected subset of all permitted values of each relevant node and all constraints is constructed.

A corresponding solution is desired for constraint 151 and nodes R2 and R3 in cluster 67, which as illustrated in this example is in the Boolean domain. To develop a set of values of the nodes that satisfy the constraints in cluster 67 (in the Boolean domain), one preferred method is to assign a permissible set of values to a first variable, such as R2, then reduce the permissible set of values of connected variable R3 in a manner consistent with constraint 151. If the resolved constraint 151 permits the original set of values of variable R2 then a satisfactory set of permissible values has been identified.

In the example illustrated, R2 is subject to a constraint suitably solved with an arithmetic solver, and is subject to another constraint suitably solved with a Boolean solver. Coordinating these solvers is an important part of the present invention.

By way of example, and for understanding the invention, a cluster 66 is represented by a corresponding propagator 66 and cluster 67 is represented by a corresponding propagator 67. The corresponding propagator can be invoked to initiate the relevant solver to resolve a set of connected constraints within such a cluster (single domain, resolving all relevant constraints consistent with constants and variables to identify a set of permissible values for each variable). In a preferred embodiment, a propagator is associated with a single set of connected constraints within a single domain, and each set of connected constraints within a single domain has an associated propagator.

Figure 4:
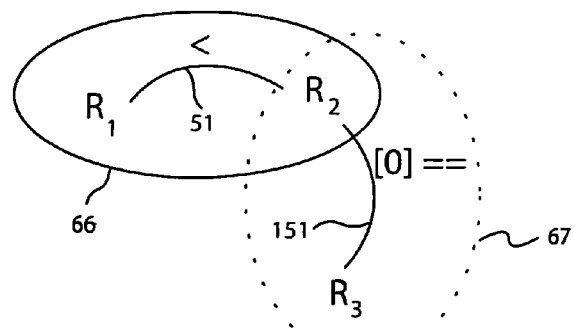
FIG. 4 illustrates a simple graph with three variables, where one variable is shared in two domains, and other variables are each only in one domain.

Referring to FIG. 5, which expands upon the example in FIG. 4, node R1 in FIG. 5 is further connected as shown to constraints 61 and 62 in cluster 166, in the arithmetic domain. To develop a set of values of the nodes that satisfy the constraints in cluster 166, one preferred method is to assign a permissible set of values to a first variable, such as R1, then reduce the permissible set of values of connected variable R2 in a manner consistent with constraint 51 as well as constraints 61 and 62. If the resolved constraint 51 permits the original set of values of variable R1 then a satisfactory set of node values has been identified.

Resolving constraints between selected nodes is well known in the art. The prior art practices discussed to this point become less helpful when the constraints to be resolved are not well adapted to the solver selected to perform this resolution process. For example, constraints that are primarily arithmetic are well matched to an arithmetic solver using, for example, range lists, such as those described in U.S. Pat. No. 6,182,258. Arithmetic constraints include linear programming or differential equations, or even simple relationships like greater than, less than, equal to, sum or difference of multiple values (variable or constant), and so on. In similar manner, constraints that are primarily binary are well matched to a binary solver using, for example binary decision diagrams (BDD). Unfortunately, binary solvers are generally not very useful for resolving arithmetic constraints, and arithmetic solvers are not well suited to resolving binary constraints. This means that the solver may (but may not) be able to present a useable solution, and in any event the process of resolving non-compatible constraints is at best slow and/or inefficient. Another useful solver known in the art is a SAT (satisfiability) engine. This solver is well adapted to constraints that have certain mixes of binary and arithmetic properties, but even here the solver is not optimized for only binary or only arithmetic constraints, and is itself not as efficient as a solver more closely compatible with primarily binary or primarily arithmetic constraints.

A major problem with any one of these solvers is that the constraints in a given design often contain a mix of constraints that are not entirely well suited for resolution with any one solver. A solution is readily at hand in making multiple solvers available, but then the coordination of solver to constraint and a variety of run-time issues need to be considered.

In a preferred embodiment of the present invention, a plurality of solvers is provided. In the static analysis phase, each constraint is assigned to a preferred solver. During verification run-time, an executive schedules the propagators resulting from the static analysis phase. Upon scheduling, each propagator is assigned to the appropriate solver as needed to refine any constraints as needed to generate a set of desired variables. The executive preferably is implemented in software in a computing platform such as those well known in the art.

A design can be still more efficiently analyzed by identifying sub-graphs of connected variables that collectively impact the set of values of connected variables, but do not affect other variables that are not connected. This is to say that if a set of constraints is to be resolved across a family of variables but does not affect or depend on any other variables, the set of connected variables and constraints may be called connected constraints. For purposes of this description, a full set of connected constraints within a single domain is considered a cluster. Where two or more clusters are connected through one or more shared variables, the whole is considered to be a connected cluster.

Each cluster is matched to a suitable solver. Each cluster is represented as a single propagator. A cluster may be quite simple, such as a single constraint requiring a variable to have some specific value. See, for example, cluster 167 in FIG. 4 with a single constraint 161 on variable R1 to have bit 0 equal to zero. Note that restricting only a portion of the variable still permits a set of values for the variable, but the constraint itself is a simple one. Setting bit zero equal to zero restricts the permissible values of R1 to even numbers.

Figure 8:
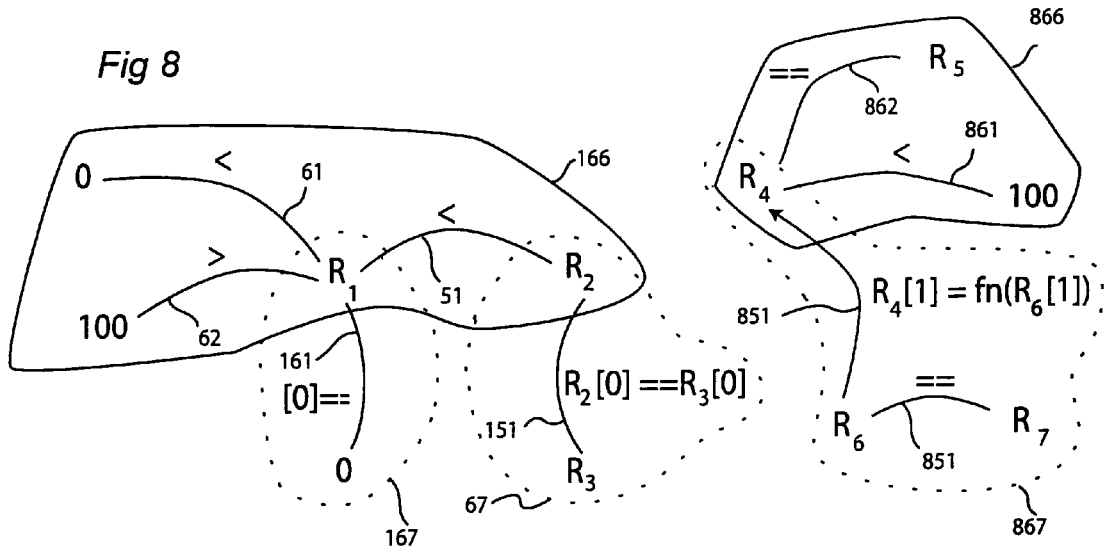
FIG. 8 illustrates two connected clusters in the same overall graph.

When the set of values of any variable in that combination of connected constraints is changed, it may be necessary to test whether constraints within the graph of the propagator are still satisfied, and if necessary to find a resolution. This resolution process can be conveniently managed by launching propagators as needed to manage the constraint resolution process. Thus for example in FIG. 5, there are propagators 67 and 167, both of which are well suited to resolution using a binary solver but yet are not directly related to each other. These are shown in clusters in the graph in FIG. 5. See also FIG. 8 for further examples of domains, clusters and propagators. FIG. 5 can be considered a single connected cluster (which may be part of a larger graph with additional connected clusters, not shown), comprised of clusters 166, 67 and 167, while FIG. 8 shows an additional connected cluster comprised of clusters 866 and 867.

The selection of which propagator is initially launched, and in what order the respective propagators are queued is managed by the executive or some suitable program element. One skilled in the art understands heuristics needed to identify stable and unstable solution orders, detection of loops (propagator 1 causes a change in a variable that sets up launching propagator 2, that in turn causes a change in a variable and sets up launching propagator 1 and so on in a manner that does not drive the system to closure or resolution), and the like.

In a preferred embodiment of the invention, any design problem or discrete portion of a design problem is described by a suitable graph. Constraints within the graph are identified, and each constraint is matched to an available solver. Constraints relating to a single node matched to a single solver are considered to be in a single domain. Each combination of one or more variables and connected constraints within a domain is characterized as, or by, a propagator. In one preferred embodiment, each independent set of connected constraints is characterized by a corresponding propagator, and each variable in a domain is connected with at least one corresponding propagator.

Referring to FIG. 4, the variable (node) R1 is related to the variable (node) R2 through constraint 51, an arithmetic relationship where R2>R1. This is illustrated to be in cluster 66, and is suitable for resolution using an arithmetic solver. Further, R2 is related to R3 through constraint 151, a binary relationship where bit 0 of each corresponding variable is equal, that is, the variables are mutually even (bit 0 is 0) or odd (bit 0 is 1). This constraint is in cluster 67, and is suitable for resolution using a binary solver. Variable R2 is shared by each of the arithmetic and binary domains including clusters 66 and 67 and is subject to constraints in each of these domains. For the graph (if this is the entire model) or sub-graph (here, a connected cluster) corresponding to the illustration of FIG. 4, rules are generated for resolving cluster 66 including constraint 51 for R1 and R2 using an arithmetic solver, and other rules are generated for resolving cluster 67 including constraint 151 for R2 and R3 using a binary solver.

Resolution of the connected cluster requires testing through impacted propagators. Propagator 66 is used to drive the arithmetic solver whenever a variable or constraint within cluster 66 is to be checked or resolved, and propagator 67 is used to drive the binary solver whenever a variable or constraint within cluster 67 is to be checked or resolved. Thus, for example, if R1 is assigned a set of values, then the arithmetic solver is invoked to select one or more suitable values for R2, using the propagator for cluster 66. When R2 is changed, the binary solver is invoked to select one or more suitable values for R3 according to constraints in that domain, here only constraint 151, using the propagator for cluster 67. The executive can schedule propagators to resolve a domain-specific sub-problem in any desired way.

Referring to FIG. 5, the graph of FIG. 4 has been extended to include more variables and constraints. In the cluster 166, node R1 is now further constrained to be greater than 0 (constraint 61) and still further constrained to be less than 100 (constraint 62). Further, in the cluster 167 node R1 is constrained to be an even number (constraint 161, bit 0 of R1 is set to be 0). In a preferred embodiment, the propagators for clusters 67 and 167 are assigned to a binary solver and the propagator for cluster 166 is assigned to an arithmetic solver. When resolving the overall graph when an initial value might be assigned to R1, the solver for propagator 166 resolves constraints 51, 61 and 62 to identify legal values for R1 and R2. The solver for propagator 167 sets R1 to satisfy constraint 161. The solver for propagator 67 sets R3 to satisfy constraint 151, and if needed resets R2. If R2 is reset, a propagator is scheduled or launched for further checking and resolution of constraints in propagator 166.

Figure 6:
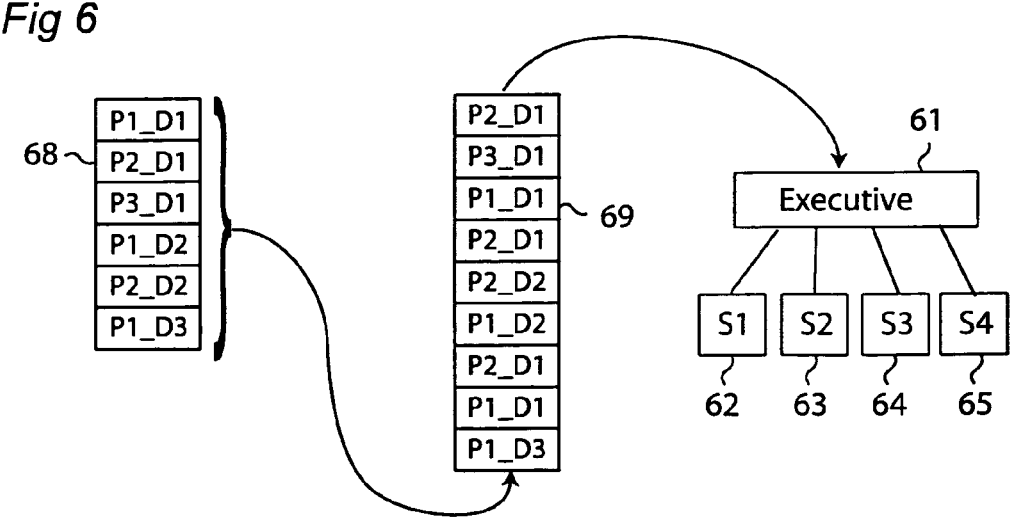
FIG. 6 illustrates an executive with four connected solvers, and a queue of propagators that can be called by the executive.

In a preferred embodiment of the present invention, two or more solvers are provided, and controlled by an executive. In a particularly preferred embodiment, this is all managed in software. Referring to FIG. 6, executive 61 is connected to four solvers 62, 63, 64, and 65. A queue 69 of propagators (illustrated as propagator 2 (P2) in domain 1 (D1), P3 in D1, P1 in D1, P2 in D1, propagator 2 (P2) in domain 2 (D2), etc.) is maintained so that propagators can be launched or initiated as desired. In one preferred embodiment, the queue can be optionally found in a table 68 of identified propagators and loaded into queue 69 according to programming techniques well known in the art. Managing the queue is under control of the executive. The executive invokes a solver as appropriate for each propagator, so in one preferred embodiment a propagator with a constraint in domain 1 would be resolved using solver 1 while a propagator with a constraint in domain 3 would be resolved using solver 3. In a preferred embodiment, each propagator is assigned to a solver suitable for the particular domain. In a particularly preferred embodiment, each solver can operate on a suitable resolution problem at the same time another solver is operating on its own assigned resolution problem.

Figure 7:
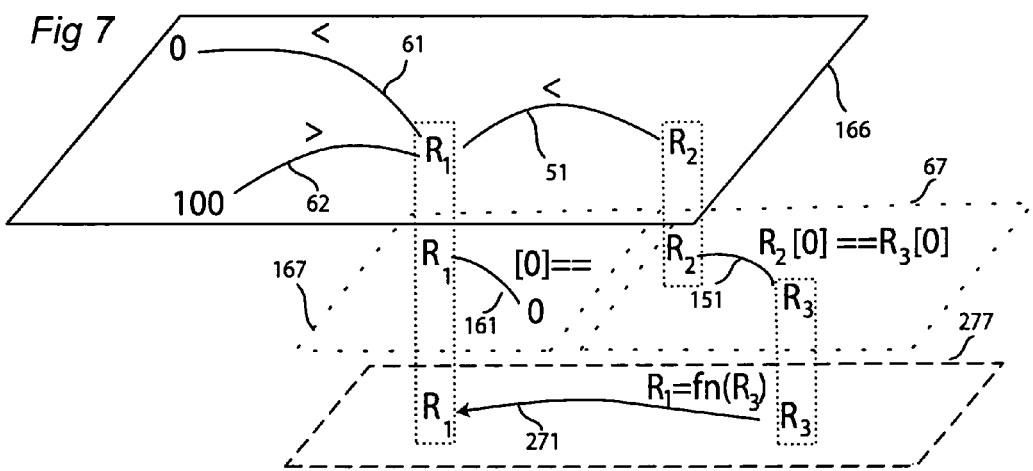
FIG. 7 illustrates a yet more complex graph, including the components of FIG. 5 but also including a third domain.

A system can have additional domains, suitable for resolution with still other solvers. Referring to FIG. 7, the graph of FIG. 5 has been extended to include a constraint 271 between nodes R1 and R3, here a function R1=fn(R3) in cluster 277. Constraints in cluster 277 are suited to resolution using a third solver. In one preferred embodiment, the third solver is an SAT engine (discussed above). Note that this constraint is unidirectional—R1 is resolved as a function of the value(s) of R3, but the constraint does not define how R3 might be calculated or otherwise resolved as a function of R1, or of anything else for that matter (at least not in cluster 277).

In FIG. 7, node R1 is shared by three clusters, 166, 167, and 277. R1 is subject to constraints in each of these clusters, as shown. Nodes R2 and R3 are each shared by two clusters. By way of illustration, each shared node is shown as an item in each relevant cluster, but the variable is one and the same even though managed or operated in different domains according to the relevant solver for that domain. A propagator is created for each cluster, thus there will be three propagators that include node R1 and two propagators that include node R2 and two propagators that include node R3.

Referring to FIG. 8, a model with two separate connected clusters is shown. On the left is the connected cluster of FIG. 5, but an additional connected cluster with nodes R4, R5, R6, and R7 with various constraints is shown. Cluster 866, like cluster 166, (and the corresponding propagator) is assigned to a first solver, which could be an arithmetic solver, and clusters 67, 167, and 867 (and the corresponding propagators) are assigned to a second solver, which could be a binary solver.

In one preferred embodiment, multiple queues 49 of propagators are maintained to manage more than one connected cluster at a time so long as a solver is available for a propagator in each queue. Thus solver 1 could be working on propagator 166 while solver 2 is working on propagator 867, for example.

Figure 9:
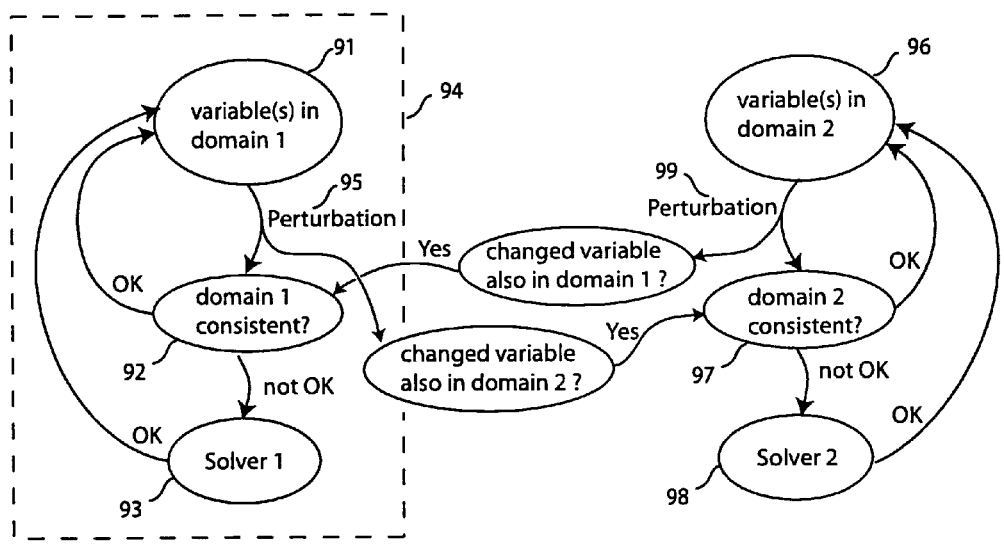
FIG. 9 illustrates a state diagram related to invoking of solvers due to domain perturbation.

Referring to FIG. 9, another perspective of on embodiment of the invention shows a representation of domain 1 (91) without detailing the variables or constraints. If a stable solution is perturbed, for example by changing the set of values of a variable in 91, then the system should be evaluated to see if the system remains consistent, that is, that all constraints remain resolved. In a preferred embodiment, this is managed using a propagator P1 that includes the variable in domain 1. If resolution is needed, solver 1 (93) is invoked, for example by queuing the propagator P1 then calling solver 1. The consistency check may be performed by the solver, or may be a look-up table of previously determined sets of values, or may be any other implementation known in the art. A similar architecture is shown for domain 2. When a perturbation in one domain impacts a set of permissible values for a shared variable, this is a perturbation across the domains. The executive initiates a propagation event in the connected domain. This may in turn lead to a further limitation on the set of permissible values and may require further resolution in domain 1. Note that a perturbation in one domain may possibly impact the set of values for any one or more shared variables when the perturbation is resolved. This illustration is for one pair of clusters, each in an independent domain. Any modification of a shared variable in a cluster that is not the subject of a given resolution process should flag at least a check of the possible impact of that modification in that and perhaps any other clusters in the connected cluster.

While the invention has been described with respect to a limited number of embodiments, it will be appreciated that many variations, modifications and other applications of the invention may be made.

What is claimed is:

1. A method for resolving a plurality of constraints over a plurality of domains for test generation for a DUT (device under test), each constraint featuring at least one variable, the method being performed by a data processor, the method comprising:

creating by a data processor at least one dynamic graph for describing a plurality of dynamic constraints, each node of the at least one dynamic graph representing a variable, and each edge of the at least one dynamic graph representing a constraint in a specific domain;

assigning by a data processor portions of the at least one dynamic graph to propagators according to determined domains, each domain corresponding to one of a plurality of constraint classes predefined according to types of values represented by variables to be constrained; and resolving by a data processor the constraints of different domains by scheduling the propagators to compute a set of possible values for each variable in the domain corresponding thereto.

2. The method of claim 1 further comprising partitioning the graph into sub-graphs of connected constraints, and further partitioning the connected constraints into sets of constraints relating to specific domains.

3. The method of claim 2 further comprising associating a cluster of connected constraints within a single domain with a specific constraint resolution engine.

4. The method of claim 3 further comprising using a first solver to solve constraints in a corresponding first domain, and using a second solver to solve constraints in a corresponding second domain.

5. The method of claim 4 further comprising managing propagators, one for each cluster, as a connection to the solver for each cluster.

6. The method of claim 5 further comprising launching a propagator to have a corresponding solver resolve constraints in the corresponding cluster.

7. A method for resolving a test generation problem, the resolution consistent with a set of constraints, said method comprising:

selecting by a data processor a first solver suitable for resolving a class of one or more first constraints in a first domain, and selecting by a data processor a second solver suitable for resolving a class of one or more second constraints in a second domain, the first and second domains each corresponding to one of a plurality of constraint classes predefined according to types of values represented by variables to be constrained, in a verification environment, identifying by a data processor one or more clusters of constraints, each cluster of constraints comprising:

a single constraint in a single domain, the constraint acting on at least one variable and not connected to any other constraints, or a plurality of constraints selected from one class of constraints and in a single domain, said class associated with a corresponding solver, wherein the plurality of constraints are connected through one or more variables or constants and, if any variable or constant is connected, one or more constants, such that said variables and said constants are connected directly or indirectly to each other by constraints within the cluster of constraints, identifying by a data processor a connected cluster comprising at least two clusters of constraints, including a first cluster of constraints in the first domain having at least one variable that is shared with a second cluster of constraints in the second domain;

using said first solver to resolve said one or more constraints in the first domain by restricting a the set of permissible values for each of one or more shared variables consistent with constraints in the first domain, and;

using said second solver to resolve said one or more constraints in the second domain by restricting a set of permissible values for each of one or more shared variables consistent with constraints in the second domain.

8. The method of claim 7 wherein the first solver is configured to resolve constraints in said first domain, and the second solver is configured to resolve constraints in said second domain.

9. The method of claim 8 further comprising selecting one or more additional solvers and a corresponding additional domain for each additional solver, each of the additional solvers suitable for resolving a class of one or more constraints, each class of constraints in a domain corresponding to the respective solver, using each of said additional solvers as selected to resolve constraints in a domain corresponding to the respective solver.

10. The method of claim 7 further comprising for one or more clusters within the connected cluster, selecting a first propagator for the first cluster in relation to one or more variables, each such variable shared with any other cluster, and selecting a second propagator for the second cluster in relation to one or more variables, each such variable shared with any other cluster.

11. The method of claim 7 further comprising when a shared variable is modified in a cluster, in a connected cluster sharing that variable where a propagator is associated with the shared variable in the connected cluster, launching said propagator, and using the corresponding solver for the connected cluster to resolve the constraints in the connected cluster.

12. The method of claim 11 further comprising before launching the propagator in the connected cluster, testing to see if the set of values of the shared variable satisfy one or more constraints for the variable in the connected cluster before the modification and, deciding whether the propagator needs to be launched.

13. The method of claim 11 further comprising flagging when resolving a cluster changes the set of values of a shared variable and noting any propagator in any other cluster that shares that variable, and, as selected, launching any one or more propagators in each such other cluster that shares the variable.

14. The method of claim 7 wherein the state of a first variable subject to one of the connected constraints in the single domain may be subject to the state of any other said variable in the cluster if the constraints, variables and constants in the cluster, are connected in a way that can place requirements on the value of that first variable, and if the constraints include connections to two or more variables, a change in the selected state of one of the variables may affect the selected state of one or more other variables connected by the connected constraints.

15. The method of claim 14 wherein each variable has a selected state which may be an initial state or a state that has been selected through a solving or other process.

16. The method of claim 7 wherein the connected cluster include essentially all clusters that are connected to each other, each shared variable within the connected cluster connecting at least one cluster to another cluster in the connected cluster, and each cluster connected to another cluster through at least one shared variable shared between the two clusters, and each cluster is connected directly or through one or more other clusters to each other cluster in the connected cluster.

17. The method of claim 16 wherein each shared variable connects at least one cluster in a first domain to another cluster in a second domain but does not connect to more than one cluster in a given domain.

18. A system for resolving a test generation problem, the resolution consistent with a set of constraints, said system comprising:

a first solver suitable for resolving a class of one or more first constraints in a first domain, a second solver suitable for resolving a class of one or more second constraints in a second domain, the first and second domains each corresponding to one of a plurality of constraint classes predefined according to types of values represented by variables to be constrained, an executive connected to each of said first and second solvers and that initiates any connected solver, wherein the executive controls passing of information about one or more clusters of constraints and which solver is suitable for resolving constraints in each said cluster, wherein the executive:
  controls use of said first solver to resolve said one or more constraints in the first domain by restricting a set of permissible values for each of one or more shared variables consistent with constraints in the first domain; and,
  uses said second solver to resolve said one or more constraints in the second domain by restricting a set of permissible values for each of one or more shared variables consistent with constraints in the second domain.

19. The system of claim 18 wherein the first solver has capabilities having a greater compatibility to resolving constraints in said first domain than to resolving constraints in the second domain, and the second solver has capabilities having a greater compatibility to resolving constraints in said second domain than to resolving constraints in the first domain.

20. The system of claim 18 further comprising one or more additional solvers and a corresponding additional domain for each additional solver, each of the additional solvers suitable for resolving a class of one or more constraints, each class of constraints in a domain corresponding to the solver, the executive connected to each said additional solvers and that initiates any connected solver.

21. The system of claim 18 further comprising means for identifying a connected cluster comprising a plurality of clusters, each cluster having at least one variable that is shared with another cluster in a different domain, means for selecting a first propagator for the first cluster in relation to one or more variables, at least one such variable shared with another cluster, means for selecting a second propagator for the second cluster in relation to one or more variables, at least one such variable shared with another cluster, and means connected to the executive for passing to the executive information from the means for identifying a connected cluster, from the means for selecting the first propagator and from the means for selecting the second propagator.

22. The system of claim 21 further comprising means connected to communicate with the executive to notify the executive when a shared variable is modified in a cluster, in a connected cluster sharing that variable where a propagator is associated with the shared variable in the connected cluster, means connected to the executive for launching said propagator, and means connected to the executive for using the corresponding solver for the connected cluster to resolve the constraints in the connected cluster.

23. The system of claim 22 further comprising means connected to communicate with the executive for testing to see if the set of values of the shared variable is consistent with the set of values of the variable in the connected cluster before the modification.

24. The system of claim 23 further comprising means connected to communicate with the executive, said means for flagging changes in the set of values of a shared variable and means connected to the executive for launching a corresponding solver to resolve constraints corresponding to the propagator for any one or more propagators in such other cluster that shares the variable.

25. A computer program product for use with a computer, the computer program product comprising a non-transitory computer usable medium having a computer readable program code embodied therein for resolving a test generation problem, the resolved test generation problem consistent with a set of constraints, said computer readable program code comprising:
  a first solver suitable for resolving a class of one or more first constraints in a first domain,
  a second solver suitable for resolving a class of one or more second constraints in a second domain,
  the first and second domains each corresponding to one of a plurality of constraint classes predefined according to types of values represented by variables to be constrained,
  an executive connected to each of said first and second solvers and that initiates any connected solver,
  wherein the executive:
    controls passing of information about one or more clusters of constraints and which solver is suitable for resolving constraints in each said cluster;
    controls use of said first solver to resolve said one or more constraints in the first domain by restricting a set of permissible values for each of one or more shared variables consistent with constraints in the first domain; and,
    uses said second solver to resolve said one or more constraints in the second domain by restricting a set of permissible values for each of one or more shared variables consistent with constraints in the second domain.

26. The computer program product of claim 25 wherein the first solver is configured to resolve constraints in said first domain, and the second solver is configured to resolve constraints in said second domain.

27. The computer program product of claim 25 further comprising one or more additional solvers and a corresponding additional domain for each additional solver, each of the additional solvers suitable for resolving a class of one or more constraints, each class of constraints in a domain corresponding to the solver, the executive connected to each said additional solvers and that initiates any connected solver.

28. The computer program product of claim 25 further comprising means for identifying a connected cluster comprising a plurality of clusters, each cluster having at least one variable that is shared with another cluster in a different domain, means for selecting a first propagator for the first cluster in relation to one or more variables, at least one such variable shared with another cluster, means for selecting a second propagator for the second cluster in relation to one or more variables, at least one such variable shared with another cluster, and means connected to the executive for passing to the executive information from the means for identifying a connected cluster, from the means for selecting the first propagator and from the means for selecting the second propagator.

* * * * *